June 15, 1954 G. GUANELLA 2,681,445
SUPER-REGENERATIVE RECEIVER
Filed Aug. 23, 1950
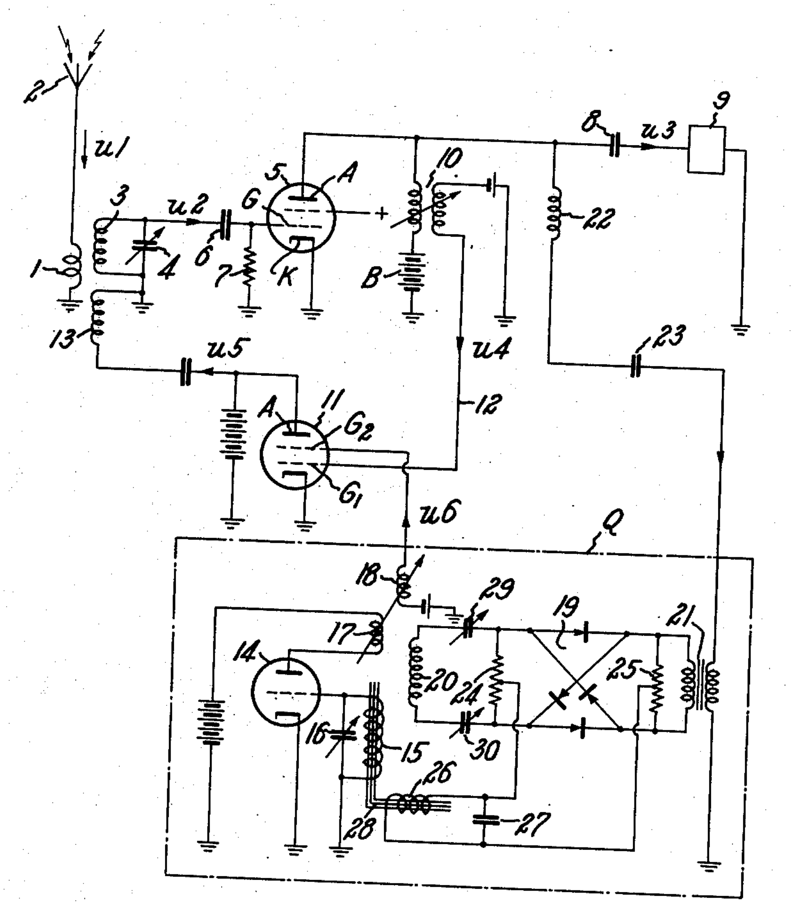
Inventor
Gustav Guanella,
By
Pierce, Scheffler & Parker,
Attorneys.

Patented June 15, 1954

2,681,445

UNITED STATES PATENT OFFICE 2,681,445

SUPER-REGENERATIVE RECEIVER

Gustav Guanella, Zurich, Switzerland, assignor, by mesne assignments, to Radio Patents Company, a partnership Application August 23, 1950, Serial No. 180,969

2 Claims. (Cl. 343—205)

This invention relates to super-regenerative receivers, and more particularly to super-regenerative receivers for use in multiplex communication systems of the modulated pulse type.

The application is a continuation-in-part of my copending application Ser. No. 614,358, filed September 4, 1945, now abandoned.

Objects of the invention are to provide super-regenerative receivers for use in multiplex communication systems of modulated pulse type, the receivers including a local oscillator developing a quench voltage of the same frequency as the pulse frequency of the individual message channels of the multiplex system, and the phase of the quench voltage being so adjusted that the periods of highest sensitivity of the receivers coincide as closely as possible with the arrival at the receiver of the successive pulses of an individual message. Objects are to provide super-regenerative receivers for the reception of messages transmitted as cyclically repeated modulated pulses of high or very-high frequency energy, the receivers including feed-back circuits conditioning the receivers for oscillation, and switching devices synchronized to operate at the frequency of pulse repetition, to render said feed-back circuits operative at the instants of arrival of successive message pulses and to effect a complete suppression of the back-coupling during intervals between pulse reception. Objects are to provide super-regenerative receivers of the character stated in which the switching device of a receiver includes an electronic tube in series in the feed-back circuit and normally biased to be non-conductive, a local oscillator generating a quench voltage of the same frequency as the pulse repetition frequency of the message to be received, and a coupling between the local oscillator and the electronic tube to render the same conductive cyclically upon the arrival at the receiver of successive pulses of the message. An object is to provide, for use in a multiplex communication system of modulated pulse type, a super-regenerative receiver having a local oscillator developing a quench voltage of a frequency equal to the N-th sub-harmonic of the pulse repetition frequency of the transmitter of the multiplex communication system, where N is the number of message channels of the multiplex system, whereby the receiver is periodically of high sensitivity for cyclically repeated pulses of one message channel but is of low sensitivity and substantially inoperative during intervals between such pulses.

These and other objects and the advantages of the invention will be apparent from the following specification and the accompanying drawing in which the single view is a circuit diagram of a super-regenerative receiver embodying the invention.

The transmitter of the communication system is not illustrated but it may be of any known type for transmitting a message, or a plurality of messages, as modulated pulses of high or very high frequency energy. The receiver includes a coil 1 across which pulses $u1$ of high frequency voltage are developed by the transmitter over a land-line connection or, as shown, by an antenna 2 in the case of a radio signal system. Coil 1 is coupled to a resonant circuit, comprising coil 3 shunted by tuning condenser 4, which constitutes the input circuit for the high frequency amplifier and super-regenerative detector tube 5. The voltage pulses $u2$ developed across the tuned circuit are impressed upon the grid G of tube 5 through the coupling condenser 6, and the grid G is returned to ground and to the grounded cathode K of the tube 5, through the resistor 7. Anode A of the super-regenerative detector tube 5 is connected through a coupling condenser 8 to a load device 9 which may be a relay, a telephone or a loud speaker responsive to rectified voltage pulses $u3$. A direct current source which is indicated schematically as a battery B imposes a positive potential upon the tube anode A through the primary winding of a transformer 10, and the secondary winding of the transformer is connected to the control grid $G_1$ of an electronic tube 11 by the lead 12 to impose an amplified high frequency voltage pulse $u4$ on that grid.

The anode A of tube 11 is connected to a coil 13 which is coupled to the inductance 3 of the input circuit of the regenerative detector tube 5, and a pulse $u5$ of high frequency voltage is thus delivered to the coil 13 to condition the tube 5 for oscillation when, as contemplated by the invention, the feed-back pulses $u5$ are accurately timed to synchronize with the arrival of the successive pulse components $u1$ of a message. The tube 11 has a second grid $G_2$ and the energizing potentials imposed upon the tube elements are such that the tube 11 operates as a switch device, i. e. it is conductive only periodically during positive voltage peaks of an oscillating voltage $u6$ of the pulse repetition of a message which is applied to the grid $G_2$. This oscillating or quench voltage $u6$ is developed by a quench oscillator system, comprising the elements within the dotted line rectangle identified by the reference character Q. The quench oscillator includes a tube 14 having a tuned grid circuit comprising an inductance 15 shunted by a variable condenser 16, and a plate inductance 17 coupled to the inductance 15. A coil or inductance 18 is coupled to the network of the oscillator tube 14 to impose the control voltage $u6$ of quench frequency upon the grid $G_2$ of the switch tube 11.

The switch tube 11 is blocked periodically by the control voltage $u6$ and the feed-back connection to the regeneration-producing coil 13 is thus completely interrupted during the major portion of cycle of quench frequency. The quench oscillator tube 14 is so controlled as to frequency and phase, as will be explained hereinafter, that the feed-back through the switch tube 11, and thereby the state of readiness of the super-regenerative detector tube 5 to break into oscillation occurs immediately prior to the arrival at the receiver of each of the successive modulated pulses of high frequency energy $u1$ of an individual message channel of a multiplex communication system. The sequence of modulated pulses is thus received with maximum gain since the sensitivity of a super-regenerative receiver is a maximum at the cyclically repeated instants when it breaks into oscillation. The oscillatory condition ceases, of course, with the termination of each received signal pulse which initiates super-regenerative oscillation of the tube 5, and the feed-back circuit for oscillation is effectively opened by the drop in the instantaneous positive value of the control voltage $u6$ on grid $G_2$ of switch tube 11, prior to the arrival of a modulated voltage pulse of the next message channel, to render the receiver substantially non-responsive to any voltages developed across the antenna coil 1, by signal pulses of other message channels or by atmospheric or other static disturbances, until the arrival of the next signal pulse of the desired message channel.

The duration of a pulse in signal transmission by short waves is usually only a small fraction, for example less than 1/100 of the pulse repetition period, and it is therefore possible to transmit a large number N of series of pulses, each pulse series constituting a separate signal channel for telephony, telegraphy, remote control or measurement, television or direction finding. The invention provides a convenient means or receiver apparatus for "filtering" the signal pulses of an individual channel to develop the message or other significant response to the modulated pulses of that channel. The pulse repetition frequency of the transmitter is NF, where N is the number of channels and F is the pulse repetition frequency of an individual channel. The quench frequency for a receiver responsive to successive pulses of only one channel is of course the $n$th sub-harmonic of the pulse repetition frequency NF of the transmitter. An individual receiver and load device will be provided for each of the channels. A single antenna system, with means for a selective phasing of the sequences of message pulses imposed upon the individual receivers, may be provided when all messages are to be received at a common reception center.

The quench oscillator system includes means, as above indicated, for control of the frequency of the control voltage $u6$ imposed upon the switch tube 11, and control of the phase relation between the rectified voltage pulses $u3$ and the positive voltage peaks of the control voltage $u6$ which determine conduction through the switch tube 11. In the illustrated embodiment of the invention, the tuned grid circuit of tube 14 is adjusted as accurately as possible to resonate at the pulse-repetition frequency of the cyclically repeated pulses of an individual message of a multiplex communication system and means is provided in the quench oscillator system for pulling the quench frequency into step or synchronism with the message pulse frequency. The synchronizing system may include a ring modulator 19 of four rectifier elements as the arms of a Wheatstone bridge, an input circuit to the bridge comprising a coil 20 coupled to the tuned circuit of the oscillator tube 14, a second and conjugate input system comprising the secondary winding of a transformer 21, the primary winding of the transformer being connected to the anode A of the super-regenerative detector tube 5 through a choke coil 22 and a coupling condenser 23. The output circuit of the ring modulator comprises center-tapped resistors 24, 25 and a coil 26 connected between the taps of the resistors and shunted by a smoothing condenser 27. The voltage developed across the coil 26 is a direct current voltage which varies in magnitude and polarity with the phase relation of the alternating current inputs, of the same frequency, applied to the bridge. The bridge output coil 26 and the grid circuit inductance 15 of the oscillator tube 14 are on a common iron core 28, and any departure of the oscillation frequency of tube 14 from synchronism with the repetition frequency of the rectified pulses develops a direct current in coil 26 which varies the effective inductance of coil 15 to restore synchronism. The phase of the quench oscillating voltage with respect to the rectified pulse voltage $u3$ and the arriving signal pulses $u1$ of a message channel may be adjusted by variable condensers 29, 30 connected between one of the bridge input circuits, for example the bridge input coil 20, and conjugate terminals of the modulator bridge.

The above description relates particularly to a communication system in which the pulses of high-frequency energy are amplitude modulated. The invention also contemplates the reception of signal pulses which are frequency or phase modulated. The demodulation is then effected in a discriminator which responds to frequency or phase deviations, and which receives its mean auxiliary frequency from a local generator.

When receiving frequency-modulated and phase-modulated oscillations, special measures are to be taken in the receiver. The frequency fluctuations present in the input of the receiver are not transmitted truly in respect of frequency as far as the demodulator. At the end of the building-up process, the oscillations have thoroughly assumed the real frequency of the building-up circuit. On the other hand, the phase position of the built-up high frequency voltages varies instantaneously with respect to the course of the quench frequency voltage according to the actual momentary displacement of the incoming trains of waves. The displacements which are effected in correspondence to the phase-modulation in the transmitter can be led back in a demodulator to the original modulating voltage.

In order to render the demodulation process as effective as possible, merely a part of the high frequency being built up need be given periodically to the demodulator. For this purpose, one chooses preferably the end of a building-up process where the amplitude has reached its highest value and no longer rises. Here, use is advantageously made of the amplitude limitation present. This periodic switching-through, exactly determined in respect of time, can be effected, for instance, by means of the cathode-anode space of an amplifier tube, the grid of which is controlled by the periodic frequency voltage. The phase deviations of the individual high-frequency waves can, however, also be led over to the original modulation voltages by phase comparison with a mean frequency in a discriminator connection. The mean comparison frequency necessary for that then corresponds to the mean transmitting frequency, therefore, to the open-circuit frequency. The frequency is derived from an undamped oscillation circuit or from a generator which is synchronized at least approximately to the incoming mean transmitting frequency. This mean frequency need not run absolutely synchronously with the mean frequency of the transmitter. It may follow, by an inconsiderable extent, the frequency fluctuations and phase fluctuations at the cost of the volume of sound.

It is to be understood that the invention is not limited to the particular circuit herein shown and described as other circuit arrangements are contemplated by and fall within the spirit of the invention as set forth in the following claims.

I claim:

1. The combination with a time-division pulse multiplex signaling system of the type wherein different signal channels are represented by like-order pulses of a corresponding number of cyclically recurring equal-numbered groups of a series of equi-distant high frequency signal pulses having a given pulse repetition frequency and the pulses of each channel are modulated according to the instantaneous values of different modulating signals, of a super-regenerative receiver comprising a quenching oscillator producing sensitizing pulses for said receiver of a frequency equal to said pulse repetition frequency divided by the number of signal channels of the system, to condition said receiver for the initiation of oscillations by the incoming signal pulses of one of said channels and to produce amplified output pulses, an electrically controllable tuning reactance determinative of the frequency of said oscillator, phase comparator means having a pair of input circuits excited by said sensitizing and output signal pulses, respectively, and including smoothing means, to produce a continuous electric control signal varying in sign and magnitude in proportion to the instantaneous relative time phase position between said sensitizing pulses and said output signal pulses, further means to vary said reactance by said control signal, to maintain a locked phase synchronism between said sensitizing pulses and said signal pulses, and means for continuously varying the time phase position of said sensitizing pulses, to selectively receive signals of a desired time signal channel by said receiver.

2. The combination with a time-division pulse multiplex signaling system of the type wherein different signal channels are represented by like order pulses of a corresponding number of cyclically recurring equal-numbered groups of a series of equi-spaced high frequency signal pulses having a given pulse repetition frequency and the pulses of each channel are modulated according to the instantaneous values of different modulating signals, of a super-regenerative receiver comprising an electron tube oscillator, a quenching oscillator producing sensitizing pulses applied to said tube of a frequency equal to said pulse repetition frequency divided by the number of signal channels of said system, to condition said tube for the initiation of oscillations by the incoming signal pulses of one of said channels and to produce amplified output pulses, an electrically controllable tuning reactance determinative of the frequency of said oscillator, phase comparator means having a pair of input circuits excited by said sensitizing and output pulses, respectively, and including smoothing means, to produce a continuous electric control signal varying in sign and magnitude in proportion to the instantaneous relative phase position between said sensitizing pulses and said output signal pulses, further means to vary said reactance by said control signal, to maintain a locked phase synchronism between said sensitizing pulses and said signal pulses, and variable phase control means for adjusting the time phase position of said sensitizing pulses to selectively receive signals of a desired time signal channel by said receiver.

References Cited in the file of this patent

UNITED STATES PATENTS

| Number | Name | Date |
|---|---|---|
| 2,363,571 | Chaffee | Nov. 28, 1944 |
| 2,408,821 | Stearns | Oct. 8, 1946 |
| 2,419,570 | Labin et al. | Apr. 29, 1947 |
| 2,520,136 | Earp | Aug. 29, 1950 |